Patented Dec. 16, 1952

2,622,037

UNITED STATES PATENT OFFICE 2,622,037

PROCESS FOR THE PRODUCTION OF BLUE IRON CYAN COMPOUNDS INSOLUBLE IN WATER

Ernst Göbel, Rio de Janeiro, Brazil

No Drawing. Application November 17, 1949, Serial No. 128,019. In Brazil August 31, 1949

10 Claims. (Cl. 106—304)

This invention relates to improvements in methods of producing insoluble blue iron cyan compounds and the products thereof.

The blue pigment known as "Prussian Blue" is produced by mixing solutions of potassium or sodium ferrocyanide with those of ferric salts, or using instead of ferric salts, the ferro salts, and oxidizing, subsequently, the so obtained colourless precipitate to the blue pigment colour.

It has been found now that this oxidation is realized advantageously with free nitrous acid, since there is obtained a good depositing and well filterable precipitate.

The necessary quantity of nitrous acid can be produced either thru introduction of nitrous gases into the mixture of reaction, of soluble ferrocyanide salts and ferro salts, or thru the addition of nitrites and the equivalent quantities of such an acid that is able to liberate nitrous acid from nitrites, as, for example, muriatic, acetic, sulfuric or other acids of sufficient strength. In place of these acids, also their salts with weak inorganic bases, such as the hydroxides of aluminum, chromium, nickel or copper may be used, which produce free nitrous acid with alkali nitrites in consequence of hydrolisis. In this case, there are precipitated, simultaneously, also the metal hydroxides—$Al(OH)_3$ or the others, together with the formation of the oxidized blue pigment.

This co-precipitation of metal hydroxides offers the following vantages:

(a) Colourless hydroxides clear up the blue shade;

(b) Coloured hydroxides are shading the blues, or are turning the blue color to the respective mixed colours;

(c) The co-precipitated metal hydroxides can influence favourably the physical quality of the precipitates.

Once the oxidation is terminated, the whole is heated in order to finish the precipitation and to meliorate the properties. Finally, the precipitated blue is separated from the mother liquor.

*Example I*

The solutions of 422 parts (weight) of potassium ferrocyanide crystals in 4000 parts of water, and 371 parts (weight) of ferrous sulfate crystals in the same quantity of water, are mixed together. Into the suspension, nitrous gas is introduced until oxidation is concluded. Then, the blue mixture is boiled, the precipitate filtered, washed and dried at a moderate temperature.

*Example II*

9 parts (weight) of crystallized ferrous sulfate are dissolved in 90 parts of water. The solution is acidulated with 3.5 parts of concentrated sulfuric acid, and to this is added a solution containing 2.3 parts of sodium nitrite, 10 parts crystallized sodium ferrocyanide and 100 parts of water. The whole mixture is stirred during one hour, then heated to the boiling point and finished as described in Example I.

*Example III*

9 parts (weight) of crystallized ferrous sulfate and 6 parts of crystallized aluminum sulfate are dissolved in 150 parts of water. To this solution is then added, under stirring, a solution of 10 parts of sodium ferrocyanide in 90 parts of water, at room temperature, and the stirring continued for half an hour. Hereupon, a solution of 2.3 parts of sodium nitrite in 15 parts of water is added, the solution stirred for one hour, then boiled during half an hour under constant stirring, allowed to cool down and to deposit; then, the clear upper solution is decanted, the deposit stirred three times more with fresh water for every time, allowed to deposit again under decanting the clear solution. The residue washed in the above manner is then filtered and dried at a moderate temperature.

In the above mentioned example, the aluminum sulfate can be substituted by equal quantities of nickel, chromium or copper salts, whereby precipitations of Prussian blue are obtained, which are mixtures with the respective metal oxide, therefore changing their shade accordingly.

I claim:

1. A process for the production of insoluble blue iron cyan compounds, comprising mixing an aqueous solution of a divalent iron salt with a water solution of a water soluble salt of hydroferrocyanic acid to form a mixture, and treating the resulting mixture with nitrous acid to produce an insoluble blue iron cyan compound from said salts.

2. A process for the production of insoluble blue iron cyan compounds, comprising mixing an aqueous solution of a divalent iron salt with a water solution of a water soluble salt of hydroferrocyanic acid to form an aqueous mixture, and treating the resulting mixture with a nitrous gas adapted to form nitrous acid in said aqueous mixture, thereby producing an insoluble blue iron cyan compound from the said salts by the action of the nitrous acid.

3. A process for the production of insoluble blue iron cyan compounds, comprising forming an aqueous mixture including a divalent iron salt, a salt of hydroferrocyanic acid and an acid adapted to liberate nitrous acid from salts of nitrous acid, and treating the aqueous mixture with a water soluble salt of nitrous acid to produce an insoluble blue iron cyan compound from the divalent iron salt and the salt of hydroferrocyanic acid.

4. A process for the production of insoluble blue iron cyan compounds, comprising forming an aqueous mixture of nitrous acid and a water soluble salt of hydroferrocyanic acid, adding to said aqueous mixture an aqueous solution of a ferrous salt, and reacting the resulting mixture to produce an insoluble blue iron cyan compound from said salts.

5. A process for the production of insoluble blue iron cyan compounds, comprising forming an aqueous mixture of a water soluble salt of hydroferrocyanic acid and a water soluble salt of nitrous acid adapted to produce nitrous acid when acidified in aqueous solution, adding to said aqueous mixture an aqueous solution of a ferrous salt and an acid adapted to produce nitrous acid from said water soluble salt of nitrous acid, and reacting said mixture to produce an insoluble blue iron cyan compound from said salts.

6. A process for the production of insoluble blue iron cyan compounds, comprising forming an aqueous mixture including a divalent iron salt, a water soluble salt of hydroferrocyanic acid and a salt of an acid and a metal producing in the aqueous mixture a weak inorganic base, and treating said aqueous mixture with a water soluble salt of nitrous acid to produce an insoluble blue compound from said salts.

7. A process as claimed in claim 6 in which said salt of an acid and a metal comprises an aluminum salt.

8. A process for the production of insoluble blue iron cyan compounds, comprising forming an aqueous mixture including a ferrous salt and a salt of a weak inorganic base, forming a second aqueous mixture including nitrous acid and a salt of hydroferrocyanic acid, mixing and interreacting said aqueous mixtures to produce an insoluble blue compound from said salts.

9. A process for the production of Prussian blue, comprising forming an aqueous mixture of a ferrous salt and a water soluble salt of hydroferrocyanic acid, and treating the resulting aqueous mixture with nitrous acid to produce Prussian blue from said salts.

10. A process for the production of insoluble blue iron cyan compounds, comprising treating an aqueous mixture containing a ferrous ferrocyanide with nitrous acid, thereby converting the ferrous ferrocyanide to an insoluble blue iron cyan compound.

ERNST GÖBEL.

REFERENCES CITED

The following references are of record in the file of this patent:

UNITED STATES PATENTS

| Number | Name | Date |
|---|---|---|
| 2,342,429 | Shack et al. | Feb. 22, 1944 |
| 2,410,219 | Langstroth | Oct. 29, 1946 |

OTHER REFERENCES

Mellor, "Comprehensive Treatise on Inorganic and Theoretical Chemistry," Longmans, Green and Co. New York, vol. 8, 1928, page 464.